(12) United States Patent
Ackerson et al.

(10) Patent No.: US 11,607,664 B2
(45) Date of Patent: **\*Mar. 21, 2023**

(54) HYDROPROCESSING REACTOR TO LOWER PRESSURE DROP AND EXTEND CATALYST LIFE

(71) Applicant: Duke Technologies, LLC, Fayetteville, AR (US)

(72) Inventors: Michael D. Ackerson, Fayetteville, AR (US); Michael Steven Byars, Fayetteville, AR (US)

(73) Assignee: Duke Technologies, LLC, Fayetteville, AR (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/234,910

(22) Filed: Apr. 20, 2021

(65) Prior Publication Data

US 2021/0237027 A1    Aug. 5, 2021

Related U.S. Application Data

(63) Continuation of application No. 16/900,043, filed on Jun. 12, 2020, now Pat. No. 10,981,142.

(Continued)

(51) Int. Cl.
*B01D 15/12* (2006.01)
*B01J 8/00* (2006.01)
(Continued)

(52) U.S. Cl.
CPC ............ *B01J 19/32* (2013.01); *B01D 15/125* (2013.01); *B01J 4/005* (2013.01); *B01J 8/0214* (2013.01);
(Continued)

(58) Field of Classification Search
CPC ........ B01D 15/00; B01D 15/08; B01D 15/10; B01D 15/12; B01D 15/125; B01J 4/00;
(Continued)

(56) References Cited

U.S. PATENT DOCUMENTS

| | | | |
|---|---|---|---|
| 4,405,562 A | 9/1983 | Zardi et al. | |
| 5,916,529 A | 6/1999 | Scheuerman | |

(Continued)

FOREIGN PATENT DOCUMENTS

| | | |
|---|---|---|
| CA | 3083062 A1 | 6/2019 |
| EP | 0285887 A2 | 10/1988 |

(Continued)

OTHER PUBLICATIONS

International Search Report and Written Opinion dated September 8, 22020 in counterpart International Patent Application No. PCT/US2020/037471.

(Continued)

*Primary Examiner* — Natasha E Young
(74) *Attorney, Agent, or Firm* — Grady K. Bergen; Griggs Bergen LLP

(57) ABSTRACT

A reactor for accommodating high contaminant feedstocks includes a reactor vessel having an inlet for introducing a feedstock containing contaminants into an interior of the reactor vessel. A basket is located within the reactor vessel interior and contains a particulate material for removing contaminants from the feedstock to form a purified feedstock that is discharged to a purified feedstock outlet. A catalyst is located within the reactor vessel and in fluid communication with the purified feedstock outlet of the basket for contacting the purified feedstock to form a desired product.

20 Claims, 4 Drawing Sheets

Related U.S. Application Data

(60) Provisional application No. 62/861,038, filed on Jun. 13, 2019.

(51) Int. Cl.
  *B01J 8/02* (2006.01)
  *B01J 8/04* (2006.01)
  *B01J 19/00* (2006.01)
  *B01J 19/32* (2006.01)
  *B01J 4/00* (2006.01)

(52) U.S. Cl.
  CPC ......... *B01J 8/0411* (2013.01); *B01J 19/0053* (2013.01); *B01J 2208/00929* (2013.01); *B01J 2208/00938* (2013.01); *B01J 2219/185* (2013.01); *B01J 2219/1943* (2013.01); *B01J 2219/2408* (2013.01); *B01J 2219/2424* (2013.01); *B01J 2219/2432* (2013.01); *B01J 2219/2475* (2013.01); *B01J 2219/32279* (2013.01)

(58) Field of Classification Search
  CPC ... B01J 4/001; B01J 4/005; B01J 19/00; B01J 19/0053; B01J 19/32; B01J 2208/00; B01J 2208/00786; B01J 2208/00893; B01J 2208/0092; B01J 2208/00929; B01J 2208/00938; B01J 2219/00; B01J 2219/18; B01J 2219/185; B01J 2219/19; B01J 2219/194; B01J 2219/1941; B01J 2219/1943; B01J 2219/24; B01J 2219/2401; B01J 2219/2402; B01J 2219/2403; B01J 2219/2408; B01J 2219/2423; B01J 2219/2424; B01J 2219/245; B01J 2219/2425; B01J 2219/2427; B01J 2219/2432; B01J 2219/2475; B01J 2219/32; B01J 2219/322; B01J 2219/32279; G01J 8/00; G01J 8/02; G01J 8/0207; G01J 8/214; G01J 8/04; G01J 8/0403; G01J 8/0407; G01J 8/0411

See application file for complete search history.

(56) References Cited

U.S. PATENT DOCUMENTS

| | | |
|---|---|---|
| 5,951,953 A | 9/1999 | Zardi et al. |
| 6,183,702 B1 | 2/2001 | Nguyen et al. |
| 6,258,900 B1 | 7/2001 | Glover |
| 10,981,142 B2 * | 4/2021 | Ackerson ............... B01J 8/0278 |
| 2003/0223924 A1 | 12/2003 | Bachtel et al. |
| 2017/0073242 A1 | 3/2017 | Gorval |
| 2018/0072957 A1 * | 3/2018 | Ackerson ............... C10G 49/00 |
| 2018/0312452 A1 | 11/2018 | Snell et al. |
| 2019/0338205 A1 | 11/2019 | Ackerson et al. |

FOREIGN PATENT DOCUMENTS

| | | |
|---|---|---|
| WO | WO9920384 A1 | 4/1999 |
| WO | WO2020126503 A1 | 6/2020 |

OTHER PUBLICATIONS

Official Action dated Mar. 3, 2022 in related counterpart Canadian Application No. 3,140,682.

Extended European Search Report with supplementary European Search Report and Search Opinion dated Jun. 14, 2022 in counterpart European Patent Application No. 20822479.0.

* cited by examiner

HYDROPROCESSING REACTOR TO LOWER PRESSURE DROP AND EXTEND CATALYST LIFE

CROSS-REFERENCE TO RELATED APPLICATIONS

This application is a continuation of U.S. application Ser. No. 16/900,043, filed Jun. 12, 2020, now U.S. Pat. No. 10,981,142, which claims the benefit of U.S. Provisional Patent Application No. 62/861,038, filed Jun. 13, 2019, each of which is hereby incorporated by reference in its entirety for all purposes.

BACKGROUND

In hydroprocessing, refiners encounter many feedstocks that contain high levels of a variety of impurities or contaminants. These contaminants may include gums, resins, metals, etc., commonly found in feedstocks such as petroleum resids, heavy vacuum gas oil (VGO), bunker fuel, distillers corn oil (DCO), tallow, vegetable oils, including used cooking oils, etc. These contaminants pose a problem for refiners because in high concentrations these contaminants are extremely detrimental to catalysts. Catalyst deactivation, poisoning, plugging, coking, and sintering are chief concerns for refiners because of the great cost involved and the enormous impact of catalyst activity on product outcomes.

In conventional hydroprocessing, trickle-bed reactors distribute a liquid reactant evenly over the surface of a catalyst bed, or through a layer of trap, support material, or grading placed over a catalyst bed for the purpose of removing contaminants. The cross-sectional area of catalyst bed, layer of trap, support material, or grading available to contact the reactants is equal to the cross-sectional area of the reaction vessel, generally a circle, such that the effective contact area, $A_c$, is represented by Equation (1) below:

$$A_c = \pi r^2 \tag{1}$$

where r is the radius of the reaction vessel, equal to $D_r/2$, where $D_r$ is the interior diameter of the reaction vessel.

Because the reactant must flow from the top down through the catalyst bed, the removed contaminants are concentrated at the top region of the catalyst bed or layer of trap, support material, or grading. This causes plugging to occur because the level of contaminants in the top region of the catalyst bed or layer of trap, support material, or grading becomes so high that the entire process is compromised, even though the catalyst, trap, support material, or grading in the middle or lower regions of the reactor have full functionality. Plugging, at any location in the reactor, causes pressure drop inside the reactor, making it difficult to control the reaction and greatly affecting product outcomes. The process must be halted, and fresh catalyst or support material must be added. With high contaminant feedstocks, catalyst plugging can occur in a matter of days or weeks, rather than months or years. Replacing catalyst this frequently is not economically feasible. As a result, there is a great need for a reactor design that will more fully utilize the entire volume of catalyst, and any optional layers of support material, to extend the usable life of the catalyst and increase process run times, especially for high contaminant feedstocks. There is also a need for a reactor design that will minimize pressure drop within the reactor, whether due to normal operating conditions or as a result of plugging in the reactor.

BRIEF DESCRIPTION OF THE DRAWINGS

For a more complete understanding of particular embodiments of the invention, and the advantages thereof, reference is now made to the following descriptions taken in conjunction with the accompanying figure, in which.

DETAILED DESCRIPTION

Figure 1:
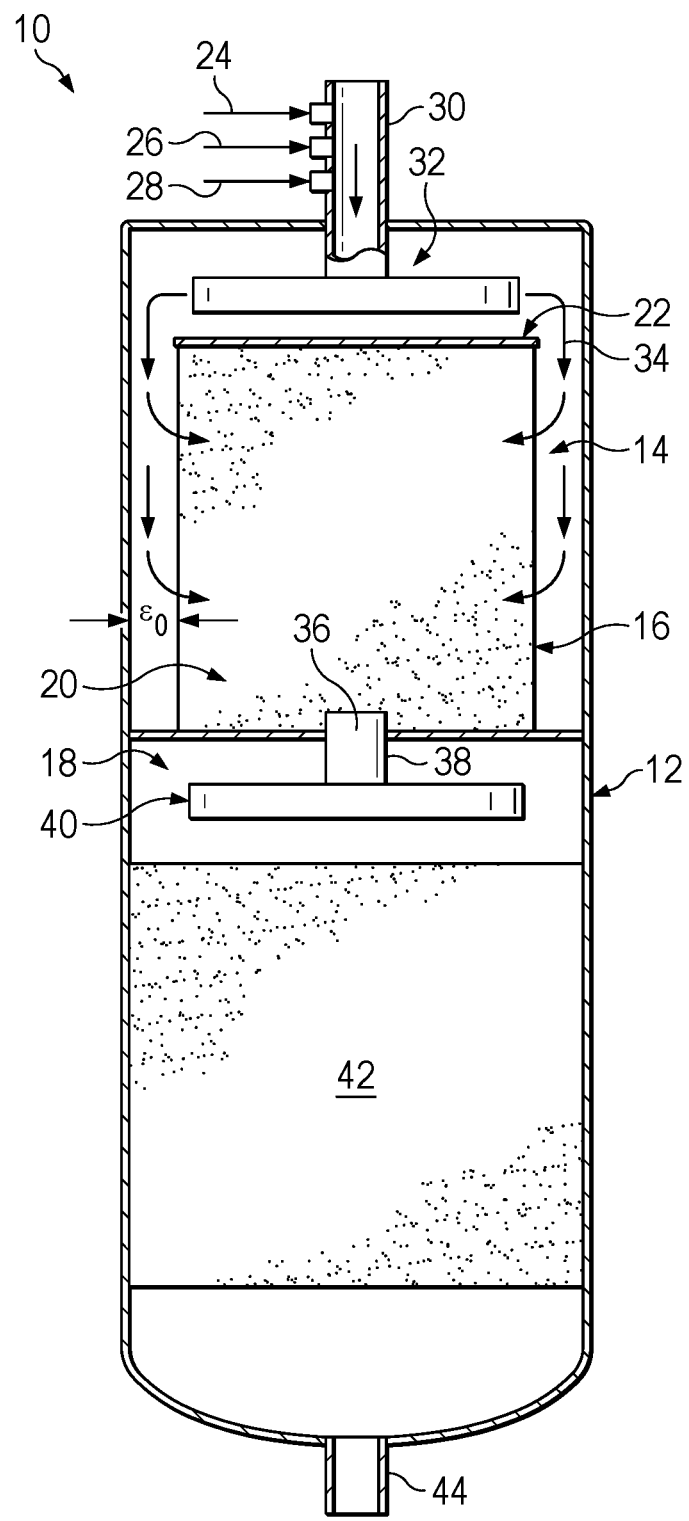
FIG. 1 is a longitudinal cross-sectional schematic of a reactor for accommodating high contaminant feedstocks configured in accordance with particular embodiments of the invention.

Disclosed herein are improved reactors that distribute liquid reactants over the entire circumferential surface and length of the catalyst bed or layer of support material, thus extending process run times and catalyst life, minimizing/delaying plugging, and minimizing pressure drop throughout the reactor. The reactors are suitable for any number of petroleum or non-petroleum feedstocks, but especially suited for use with feedstocks wherein impurities or contaminants are of significant concern. These may include, but are not limited to, tallow, beef tallow, distillers corn oil, used cooking oil, pyrolysis oils, heavy VGO's, vacuum resids from petroleum processing, bunker fuel, triglyceride-containing feedstocks, etc. The contaminants may be gums, resins, and/or metal contaminants that are present in the feed.

The improved reactors are for use in hydroprocessing or similar processes. The feedstock, or liquid reactant, is combined with hydrogen gas, and, optionally, a solvent or diluent such as heavy naphtha, propane, butane, pentane, light hydrocarbons, light distillates, naphtha, diesel, VGO, previously hydroprocessed stocks, or combinations thereof, inside a reaction vessel containing at least one of a catalyst, system of catalysts, trap, support material, or grading, or a combination of these materials. The feedstock, hydrogen gas, and any diluent may be combined inside the reaction vessel or combined before entering the vessel. The temperature and pressure inside the vessel should be maintained at typical operating conditions for hydroprocessing, e.g., 250° F. to 850° F. and 0 psig to 3000 psig.

In certain instances the temperature inside the reaction vessel may be from at least, equal to, and/or between any two of 250° F., 260° F., 270° F., 280° F., 290° F., 300° F., 310° F., 320° F., 330° F., 340° F., 350° F., 360° F., 370° F., 380° F., 390° F., 400° F., 410° F., 420° F., 430° F., 440° F., 450° F., 460° F., 470° F., 480° F., 490° F., 500° F., 510° F., 520° F., 530° F., 540° F., 550° F., 560° F., 570° F., 580° F., 590° F., 600° F., 610° F., 620° F., 630° F., 640° F., 650° F., 660° F., 670° F., 680° F., 690° F., 700° F., 710° F., 720° F., 730° F., 740° F., 750° F., 760° F., 770° F., 780° F., 790° F., 800° F., 810° F., 820° F., 830° F., 840° F., and 850° F.

In some applications, the operating pressure of the reactor may be from at least, equal to, and/or between any two of 0 psig, 10 psig, 20 psig, 30 psig, 40 psig, 50 psig, 60 psig, 80 psig, 90 psig, 100 psig, 110 psig, 120 psig, 130 psig, 140 psig, 150 psig, 160 psig, 170 psig, 180 psig, 190 psig, 200 psig, 250 psig, 300 psig, 350 psig, 400 psig, 450 psig, 500 psig, 550 psig, 600 psig, 650 psig, 700 psig, 750 psig, 800 psig, 850 psig, 900 psig, 950 psig, 1000 psig, 1050 psig, 1100 psig, 1150 psig, 1200 psig, 1200 psig, 1250 psig, 1300 psig, 1350 psig, 1400 psig, 1450 psig, 1500 psig, 1550 psig, 1600 psig, 1650 psig, 1700 psig, 1750 psig, 1800 psig, 1850 psig, 1900 psig, 1950 psig, 2000 psig, 2050 psig, 2100 psig, 2150 psig, 2200 psig, 2200 psig, 2250 psig, 2300 psig, 2350 psig, 2400 psig, 2450 psig, 2500 psig, 2550 psig, 2600 psig, 2650 psig, 2700 psig, 2750 psig, 2800 psig, 2850 psig, 2900 psig, 2950 psig, and 3000 psig.

It should be noted in the description, if a numerical value, concentration or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that inventor possesses the entire range and all points within the range.

Optionally, an additive may be combined with the feedstock and hydrogen gas to enhance removal of the impurities or contaminants. Non-limiting examples of the additive may include hydrogen sulfide (H$_2$S), bisulfide, thiols, dodecanethiol, sulfur-containing vent gases (e.g., H$_2$S, etc.), etc. These are discussed more fully later on.

The reactor comprises a basket within a reaction vessel. The basket may be cylindrical in shape and may have a diameter that is less than that of the reaction vessel, and may be formed from a material that will constrain solid matter but allow gases and liquids to flow freely through it. This may include a metal mesh or screen material. The basket material can be selected such that the percentage of open area in the material yields an optimal pressure drop across the basket material to ensure proper distribution of gases and liquids over the entire length of the basket. The basket is filled with particulate matter that serves to remove contaminants from the liquid reactant. This particulate matter may include trap, support material, or grading, catalyst, or a combination of these materials. Such materials may include such things as sand, gravel, catalyst, spent catalyst, off-spec catalyst, regenerated catalyst, catalyst carriers, ceramic rings, etc., and combinations of these.

The basket may be filled completely with particulate matter, or the basket may be structured to form a cylindrical annulus or ring of material, with a cylindrical void or column of space running vertically through the center of the basket. Furthermore, the basket may incorporate annular walls to segregate multiple types of different particulate matter within the basket. The basket may extend along substantially the entire length of the reaction vessel, or it may be placed in a compartment above a catalyst bed inside a segregated reaction vessel. The basket may be covered with a lid or cover that covers the entire diameter of the basket so that the upper end of the basket is closed to prevent passage of fluids through the upper end of the basket. In other embodiments, the upper end of the basket may have a cover or lid having apertures or openings that allows some amount of fluids to pass downward through the upper end of the basket.

In certain embodiments, where the basket has a cylindrical configuration, the outer surface area of catalyst bed, layer of trap, support material, or grading available to contact the reactants is equal to the surface area of the outer walls of the basket, such that the effective contact area, A$_c$, is equal to Equation (2) below:

$$A_c = \pi D_b L \quad (2)$$

where D$_b$ is the outer diameter of the basket and L is the length of the basket. It should be noted, that where the basket has a non-cylindrical configuration, the contact area may be differently calculated. As can be appreciated, the area Ac according to Equation (2) can be configured so that it has a much larger contact area than that provided by the contact area A$_c$ of Equation (1) as provided in the prior art reactors.

The feedstock to be treated and hydrogen, along with any desired diluents or additives, are introduced into the reactor inlet. A liquid distributor is used to disperse liquid outward, toward the walls of the reaction vessel. The liquid flows outward toward the walls of the reaction vessel and down into the circumferential gap between the walls of the reaction vessel and the outer walls of the basket. From the circumferential gap, liquid is then drawn through the basket to the outlet near the base of the basket. The outlet may be in fluid communication with the cylindrical void or column of space running vertically through the center of the basket, if one is provided. Optionally, the liquid may then be distributed over a catalyst bed in a lower compartment of the reaction vessel. The product exits the reactor through an outlet near the bottom of the reaction vessel.

Where the reactor vessel and basket are cylindrical, the circumferential gap or annular space $\varepsilon_0$ between the reaction vessel and the exterior of the basket can be characterized by Equation (3) below:

$$\varepsilon_0 = (D_r - D_b)/2 \quad (3)$$

where D$_r$ is the interior diameter of the reactor vessel and D$_b$ is the diameter of the outer wall of the basket.

The circumferential gap may be calculated differently for non-cylindrical reactor vessels and baskets. The circumferential gap $\varepsilon_0$ impacts the velocity at which the reactants move through the reactor. The basket should be sized to provide a circumferential gap $\varepsilon_0$ that will facilitate operation within the range of desired flow rates.

In one embodiment, the reactor comprises a segregated reaction vessel. The basket may be a cylindrical shell or cylindrical annulus that extends along the length of an upper compartment of the reaction vessel. The basket walls are fluid permeable or formed from a material that will constrain solid matter but allows gases and liquids to flow freely through them. The basket may have a fluid-impenetrable top and bottom, only permitting liquids or gasses to pass through the bottom of the basket at or through a basket outlet. The basket contains trap, support material, or grading, or optionally, a combination of trap, support material, or grading, and catalyst with the trap, support material, or grading forming the outer circumferential layer of particulate matter within the basket and the catalyst forming an inner circumferential layer of the particulate matter of the basket, with the layers separated by a fluid-penetrable or permeable barrier or layer of material or structure that constrains the different solid materials but allows gases and liquids to flow freely through it. The basket may incorporate a plurality of different radially spaced annular or circumferential layers or beds of particulate matter.

The reactants, comprised of a feedstock and hydrogen, along with any desired diluents or additives, is introduced into the upper compartment of the reaction vessel through the reactor inlet. This may be accomplished with or without the use of a liquid distributor. With respect to the liquid distributor, this may be located below and in fluid communication with the reactor inlet for discharging the feedstock radially outward towards the interior walls of the reactor vessel. In most instances the reactors are oriented so that overall liquid flow is generally directed downward from top to bottom through the reactor. The reactants may flow out, over the impenetrable top covering of the basket or through a distributor assembly where they are directed radially outward toward the walls of the reaction vessel, and down into the circumferential gap or annular flow space formed between the walls of the reaction vessel and the outer walls of the basket. The reactants are then drawn or flow radially inward through the basket, reacting with the particulate matter inside the basket to form a partially reacted or purified liquid having a reduced quantity of contaminants prior to passing to the catalyst bed.

After passing through the basket, the partially reacted liquid having reduced contaminant content then passes through an outlet at the base of the upper compartment of the reaction vessel to a lower compartment of the reactor containing a catalyst bed. The partially reacted liquid may be distributed evenly over the surface of the catalyst bed by a distributor and reacts with the catalyst to form the desired product. Optionally, the reaction vessel may contain multiple lower compartments containing catalyst beds in order to form the desired product. The product is removed from the reactor near the base of the reaction vessel through a reactor outlet.

In another embodiment, the basket may be a cylindrical shell or cylindrical annulus that extends along all or a portion of the length of the reaction vessel. The basket may be a segregated basket that contains trap, support material, or grading, catalyst, or a combination of trap, support material, or grading and catalyst with the support material forming an outer annular or circumferential layer of particulate matter within the basket and the catalyst forming an inner annular or circumferential layer of the particulate matter of the basket. The layers are separated by a fluid penetrable or permeable barrier or layer of material or structure that constrains solid matter but readily allows gases and liquids to flow freely through it.

In certain instances, the basket may incorporate a plurality of different radially spaced annular or circumferential layers of different particulate matter. The reactants, comprised of a feedstock and hydrogen, along with any desired diluents or additives, is introduced into the reaction vessel through the reactor inlet. This may be accomplished with or without the use of a liquid distributor. The reactants may flow over the impenetrable top covering the basket or out from the distributor radially outward toward the interior walls of the reaction vessel, and down into the annular space or circumferential gap formed between the walls of the reaction vessel and the basket. The reactants are then drawn or flow radially inward through the basket, reacting with the different particulate matter inside the basket to form the desired product. After passing through the basket, the product then passes through an outlet at the base of the reactor.

Referring to FIG. 1 a cross-sectional schematic of a reactor 10 configured as a segregated reaction vessel is shown. The reactor 10 is comprised of a reaction vessel 12 having an upper compartment 14 containing a basket 16 and a lower compartment 18 containing a catalyst bed. The basket 16 in the upper compartment 14 forms a fluid penetrable or fluid permeable barrier and is formed from a material or structure that will constrain solid particulate matter but allows gases and liquids to flow freely through it, while containing a solid particulate matter, such as those described previously, that serves to remove contaminants such as gums, metals, resins, etc. The area within the basket 16 containing the particulate matter constitutes a contaminant removal zone or pretreatment bed 20 of the reactor 10. The basket 16 is shown covered by a fluid impermeable solid top or cover 22.

A feedstock 24 containing contaminants, hydrogen gas 26, and a diluent 28 are each introduced into an inlet 30 of the reactor 10 by a distributor assembly 32 in the upper compartment 14 of the reaction vessel 12. The combined feeds 34 are dispersed radially outward toward the walls of the reaction vessel 12 and flow over the fluid impenetrable solid top 22 that covers the basket 16. The combined feeds 34 may flow down and over the cover 16 into the circumferential gap 60 between the walls of the reaction vessel 12 and the walls of the basket 16. Alternatively, the feeds 34 may be discharged from the distributor assembly 32 radially outward towards the interior walls of the reactor vessel 12. The combined feeds 34 then flow through the walls of the basket 16 and through the solid particulate matter forming the pretreatment bed 20 contained within the basket 16 wherein contaminants are removed in a contaminant-removal pretreatment.

The purified or pretreated feeds or reactants then flow out of an outlet 36 of the basket 16 of the upper compartment 14 of the reaction vessel 12 and through a conduit outlet 38 at the base of the upper compartment 14. The purified feed then flows into the lower compartment 18 of the reaction vessel 12 through a second distributor assembly 40. The purified feed is dispersed evenly over the surface of the catalyst bed 42 (e.g., a hydroprocessing catalyst) where the reactants react to form a product that flows out of an outlet 44 of the reactor 10 at the base of the reactor 10.

Figure 2:
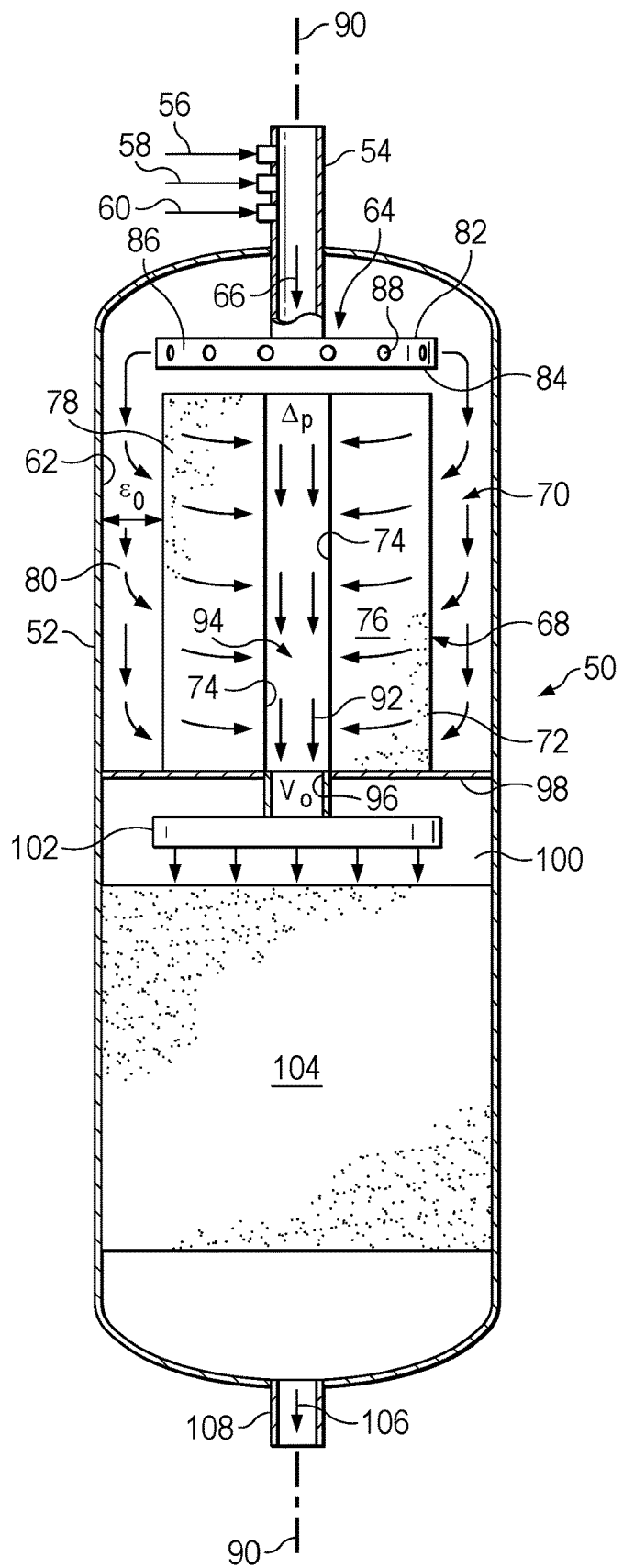
FIG. 2 is a longitudinal cross-sectional schematic of another embodiment of a reactor for accommodating high contaminant feedstocks configured in accordance with particular embodiments of the invention.

FIG. 2 shows a longitudinal cross-sectional schematic of another embodiment of a reactor 50. The reactor 50 includes a reactor vessel 52 having an inlet 54 for introducing a contaminant-containing feedstock 56 to be processed, along with hydrogen gas 58, and any optional diluent 60 or other additives. The interior of the reactor vessel is defined by an interior wall 62 of the reactor vessel 52. A distributor assembly 64 of the reactor 50 is located below and in fluid communication with the inlet 54 for discharging the combined feeds 66 radially outward towards the interior walls 62 of the reactor vessel 52.

A basket 68 is located within an upper compartment 70 of the reactor vessel 52 interior and below the distributor assembly 64. The basket 68 has a fluid permeable outer wall 72 and a fluid permeable inner wall 74 that is spaced radially inward from the outer wall 72 to define an annular interior space 76 of the basket 68. The annular interior space 76 of the basket 68 contains a particulate material, such as those described previously, suitable for removing contaminants from the feedstock to form a contaminant removal zone or pretreatment bed 78. The outer wall 72 of the basket 68 is spaced radially inward from the interior wall 62 of the reactor vessel to define an annular flow space 80 between the outer wall 72 of the basket 68 and the interior wall 62 of the reactor vessel 52.

The distributor assembly 64 may be configured with two spaced apart upper and lower plates or disks 82, 84, which may be circular in shape and parallel or substantially parallel to one another. The plates 82, 84 are joined together along their outer perimeters by a circumferential wall 86. Radially spaced apart apertures, slots or openings 88 are provided around all or a portion of the circumferential wall 86 to allow the combined feed 66 to be discharged from the distributor assembly 64 radially outward in all directions (i.e., 360°) towards the interior walls 62 of the reactor vessel 52. This discharge of the feed from the distributor assembly 64 is oriented generally perpendicular to a central longitudinal axis 90 of the reactor vessel 52 that extends along its length. In other embodiments, the feed discharged from the distributor assembly 64 may be oriented at a non-parallel angle to the axis 90, such as from 30° to 90° relative to the axis 90.

The combined feeds 66 introduced into the reactor vessel 52 from the distributor assembly 64 flow through the annular flow space 80 and radially inward through the annular interior space 74 of the basket 68 and through the pretreatment bed 78 to facilitate removal of contaminants from the feedstock to form a pretreated or purified feedstock 92. The fluid permeable inner wall 74 forms a pretreated or purified feedstock outlet of the basket 68 and defines a central conduit 94 that extends along the length of the basket 64. The central conduit 94 may be concentric or non-concentric with the longitudinal axis 90. The central conduit 94 has a conduit outlet 96 for discharging the purified feedstock 92 through a fluid impermeable floor or partition 98 of the upper compartment 70 that prevents axial fluid flow through the basket 68 and annular space 80.

The pretreated or purified feed 92 then flows into a lower compartment 100 of the reaction vessel 52 through a second distributor assembly 102. The purified feed 92 is dispersed evenly over a catalyst bed 104 containing a selected catalyst (e.g., a hydroprocessing catalyst) located within the lower compartment 100 where the reactants react to form a desired product 106 that flows out of an outlet 108 of the reactor 50 at the base of the reactor 50.

In the design and configuration of the reactor 50 and basket 68 certain criteria should be met. If the liquid flow velocity at or near the top of the annular flow space 80 of the upper compartment 70 is zero due to there being no liquid present, a maldistribution is created through the pretreatment bed 78 within the interior space 76 of the basket 68. Instead, the liquid feed will tend to accumulate in the lower portion of the annular flow space 80 so that it only passes through lower portion of the basket 68 pretreatment bed 78. This essentially reduces the effective contact area of the basket. Without proper configuration, as much as 80% of the liquid feed, as an example, may pass through the lower one-third of the basket 68, while the remaining 20% of the liquid feed passes through the upper two-thirds of the basket 68. This can result in premature plugging of the pretreatment bed 78 in the lower one-third of the basket.

To ensure that this does not happen, certain design parameters must be met. This includes ensuring that all liquid flow velocity changes are the same throughout the pretreatment operation. Such liquid flow velocities include the velocity at the reactor inlet 54, the radial velocity at the distributor assembly 64, the velocity down the annular flow space 80, the radial velocity through the pretreatment bed 78, and the velocity through the central conduit 94. By way of example, if the velocity of fluid flowing through the reactor inlet 54 is 20 ft/s, then the fluid velocity through the distributor assembly 64, the velocity down the annular flow space 80, the radial velocity through the pretreatment bed 78, and the velocity through the central conduit 94 should also be 20 ft/s or approximately so.

To achieve this, it is important that the reactor vessel and distributor assembly are configured so that liquid fluid flow of the combined feeds from the distributor assembly provides a stagnation head $h_s$ that meets the criteria represented by Equation (4) below:

$$h_s \leq D_r/2 \qquad (4)$$

The circumferential gap $\varepsilon_0$ also comes into play and should meet the relationship with respect to $D_r$ and $D_b$ represented in Equation (3), described previously. This gives the liquid velocity in the annular flow space 80 the same velocity of the radially discharged liquids discharged from the distributor assembly 64.

The fluid permeable inner wall 74, which forms an outlet of the basket 68, should also have a sufficient open area to allow the passage of fluids therethrough to avoid a significant maldistribution of liquid through the particulate matter of the pretreatment bed 78. The inner wall 74 is therefore configured with a sufficient open area to provide a selected pressure drop $\Delta P$ across the inner wall 74. This pressure drop $\Delta P$ should range from 2 to 10 times the velocity head $h_v$ at the conduit outlet 96. This may be represented by the following Equation (5) below:

$$\Delta P = C \cdot h_v \qquad (5)$$

where C ranges from 2 to 10. In certain embodiments, C may be at least, equal to, and/or between any two of 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, and 10.0.

The velocity head $h_v$ may be determined according to Equation (6) below:

$$h_v = V_o^2/2G_c \qquad (6)$$

where $V_o$ is the velocity of liquid flow at the conduit outlet 96 and $G_c$ is the gravitational acceleration constant (i.e., $G_c = 32.17$ ft/s$^2$).

Another relationship that does not necessarily relate to the overall functionality of the reactor but relates to the life of the pretreatment bed 78 is the length $L_b$ of the basket. Assuming that plugging of the pretreatment bed is directly proportional to the area of flow through the pretreatment bed or basket, the higher the area of flow the longer the pretreatment bed should last. A selected or optimal length $L_b$ for the basket may be determined from the following Equation (7) below:

$$L_b = (D_r^2/4D_b)(\psi) \qquad (7)$$

where $D_r$ is the interior diameter of the reactor vessel, $D_b$ is the diameter of the fluid permeable outer wall of the basket, and $\psi$ is a coefficient corresponding to the cycle life of the pretreatment bed, which may range from 1 to 20, with $L_b \leq L_r$, where $L_r$ is the length of the reactor vessel. In certain embodiments, w may be at least, equal to, and/or between any two of 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, and 20.0.

Figure 3:
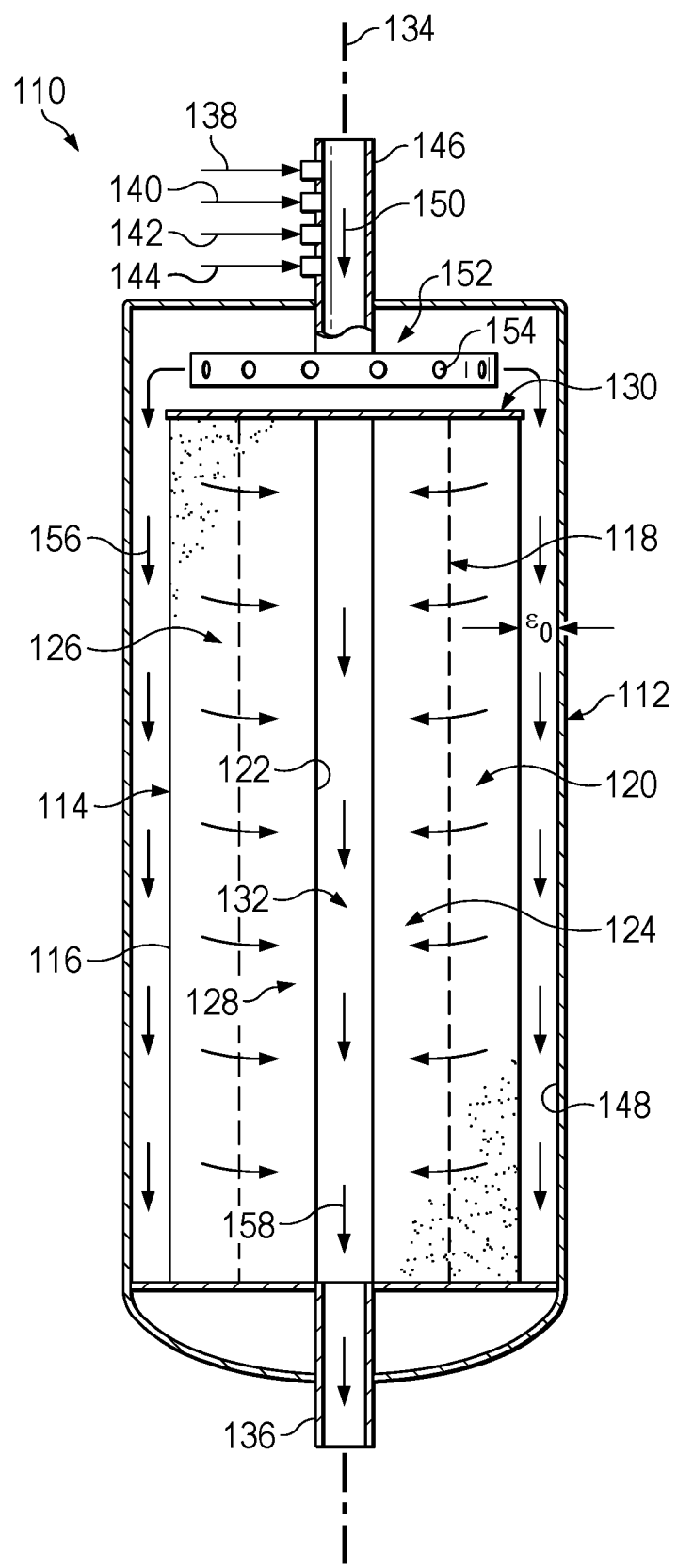
FIG. 3 is a longitudinal cross-sectional schematic of alternate embodiment of reactor for accommodating high contaminant feedstocks employing a single reaction zone and a segregated basket configured in accordance with particular embodiments of the invention.

Referring to FIG. 3, another embodiment of a reactor for accommodating high contaminant feedstocks is shown. This shows a longitudinal cross-sectional schematic of a reactor 110. The reactor 110 is configured similarly to the reactor 50 of FIG. 1 but employs a single reaction zone and a segregated basket to carry out both contaminant removal and processing of the feedstock to form the desired final product. The design criteria and relationships described above also apply to this configuration, as well.

The reactor 110 comprises a reaction vessel 112 containing a segregated basket 114 in the shape of a cylindrical annulus. The basket 114 is defined by an circumferential outer wall 116 formed as a fluid-penetrable or permeable barrier formed from a material or structure that will constrain solid particulate matter but allows gases and liquids to flow freely through the outer wall 116. The outer wall 116 forms a fluid inlet of the basket 114. The basket 114 further includes and contains an inner intermediate circumferential segregating wall or structure 118 spaced radially inward from the outer wall 116 of the basket 114. The wall 118 may be configured similarly or differently and from the same or different materials as the outer wall 116 of the basket 114. The outer wall 116 of the basket 114 and the inner wall 118 defines an outer circumferential annular space 120 of the basket 114.

A further fluid permeable circumferential innermost wall 122 of the segregated basket 114 is spaced radially inward from the intermediate wall 118. The circumferential area located radially inward from the inner intermediate wall 118 and the innermost wall 122 forms an inner circumferential annular space 124 of the basket 114. The outer annular space 120 of the basket 114 is filled with a solid particulate material, such as those described previously for contaminant removal, which forms a contaminant removal zone or pretreatment bed or layer 126. The pretreatment bed or layer 126 serves to remove contaminants such as gums, metals, resins, etc.

The innermost annular space 124 of the basket 114 is filled with a processing catalyst to form a catalyst bed or layer 128 (e.g., a hydroprocessing catalyst) that forms a reaction zone. The fluid permeable intermediate wall 118 thus forms an outlet of the contaminant removal zone 124 of the basket 114. The basket 114 may be covered by an impermeable lid or cover 130. In other embodiments, the cover 130 may be permeable to allow some amount of feedstock downflow.

The innermost wall or structure 122 may be configured similarly or differently and from the same or different materials as the outer wall 116 and/or intermediate wall 118 of the basket 114 for constraining solid matter 124 but allowing gases and liquids to flow freely through the innermost wall 122. The innermost wall 122 retains the particulate catalyst material of the catalyst bed 128 in the annular space 124 and further defines a central conduit 132 that is free from any particulate solid material. The innermost wall 122 thus forms an outlet of the catalyst bed 128. The central conduit 132 may be concentric or non-concentric with a longitudinal axis 134 of the reactor vessel 112. The conduit 132 is in fluid communication with an outlet 136 located at the base of the reactor vessel 112.

A contaminated feedstock 138 to be processed, hydrogen gas 140, an optional additive 142, and an optional diluent 144 are introduced into an inlet 146 of the reactor 110 into the interior of the reactor vessel 112, which is defined by an interior wall 148, as combined feeds 150. A distributor assembly 152 of the reactor 110 is located below and in fluid communication with the inlet 146 for discharging the combined feeds 150 radially outward towards the interior walls 148 of the reactor vessel 52.

The reactants or combined feed 150 is dispersed radially outward from the distributor assembly 152 toward the walls of the reaction vessel 112. The distributor assembly 152 may be configured similarly to the distributor assembly 64 of the reactor 50 of FIG. 2. The combined feeds flow down through an annular flow space 156, which is defined by the interior walls 148 of the reactor vessel and the outer wall 116 of the basket 114.

The feed flows from the annular flow space 156 and radially inward through the outer annular space 120 of the basket 114 and through the pretreatment bed 126 to facilitate removal of contaminants from the feedstock to form a purified feedstock. The fluid permeable intermediate wall 118 thus forms a purified feedstock outlet of the basket 114. A fluid impermeable floor or barrier at the bottom or base of the reactor vessel 112 may be provided to prevent axial fluid flow through the basket 114 and annular space 156. The purified feedstock continues to flow through the innermost annular space 124 and through the catalyst bed 128 of the basket 124 to form a product 158 that flows into the central conduit 132 that forms an outlet of the basket 114. The central conduit 132 extends vertically through the center of the basket 114. The product 90 then flows from the central conduit 132 of the basket 114 to reactor outlet 134 at the base of the reactor 110.

Figure 4:
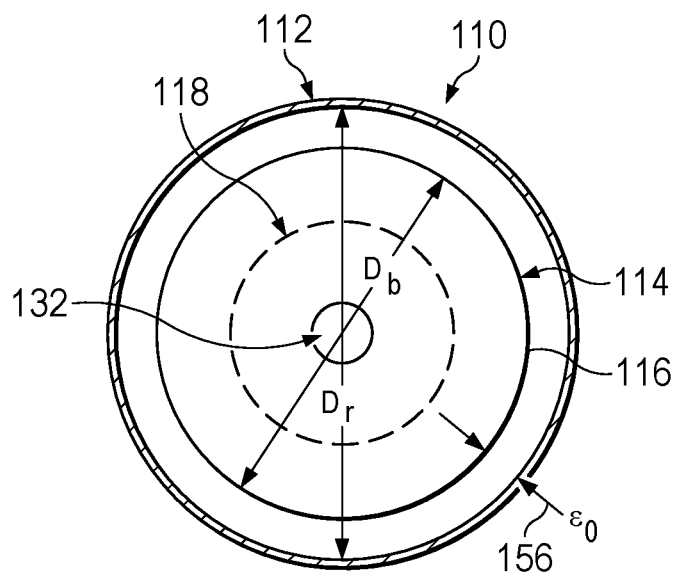
FIG. 4 is a transverse cross-section schematic of the reactor of FIG. 3.

Referring to FIG. 4 a transverse cross-sectional schematic of the reactor 110 containing the single reaction zone and the segregated basket 114 in the shape of a cylindrical annulus is shown. The reactor 110 is comprised of the reaction vessel 112 having a diameter $D_r$. Within the reaction vessel 112 is the basket 114 having a diameter $D_b$ and containing an intermediate circumferential segregating wall 118. The circumferential gap or annular space 156 (Eo) is formed between the interior walls 148 of the reaction vessel 112 and the outer permeable wall 116 of the basket 114. At the center of the reaction vessel 112 is the central conduit 132.

In certain applications, the reactors for accommodating high contaminant feedstocks, such as the reactors 10, 50, and 110, may be used in combination with a further metal-removal treatment process. The metal-removal treatment process can be used to treat the contaminated feedstock prior to its being introduced into the reactors employing the contaminant removal baskets, as have been described. Alternatively, the metal-removal treatment process can be used to treat a pretreated or purified feedstock after it has been discharged from the outlet of the contaminant removal basket and prior to its introduction into the reaction zone for producing the desired product.

The metal-removal treatment process provides a simple and inexpensive method for removing impurities from lower quality refinable feedstocks containing a large number of impurities or contaminants. The contaminants may be metal contaminants that are present in the feed. These metals may include, but are not limited to, nickel (Ni), vanadium (V), phosphorus (P), iron (Fe), etc. The metal contaminants may be present in the feedstock in an amount from at least, equal to, and/or between any two of 1 ppm, 2 ppm, 3 ppm, 4 ppm, 5 ppm, 6 ppm, 7 ppm, 8 ppm, 9 ppm, 10 ppm, 15 ppm, 20 ppm, 30 ppm, 40 ppm, 50 ppm, 60 ppm, 70 ppm, 80 ppm, 90 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, and 1000 ppm or more by weight of the feedstock.

In the metal-removal pretreatment process, the feedstock is combined with a selected amount of an additive. The additive is that which is capable of reacting or complexing with the metal contaminants contained in the feedstock to form a precipitate. This can include sulfur, or sulfur-containing compounds that generate sulfur for reacting with the metal contaminants, although non-sulfur additives that provide similar reactions with metal contaminants may also be used. Non-limiting examples of the additive may include hydrogen sulfide ($H_2S$), bisulfide, thiols, dodecanethiol, sulfur-containing vent gases (e.g., $H_2S$, etc.), etc. The quantity of additive required for the pretreatment process may be proportional to the amount of metal and quantity of contaminants desired to be removed from the feedstock.

In certain embodiments, the additive may be used in an amount of from greater than 0 to 10 times or more than that necessary to react with all the metal contaminants to be removed from the feedstock. Thus, the additive may be added in an amount that is in stoichiometric excess of the amount needed to complex with the metal contaminants of the feed. In certain embodiments, the amount of additive used may be an amount from at least, equal to, and/or between any two of greater than 0.1, 0.2, 0.3, 0.4, 0.5, 0.6, 0.7, 0.8, 0.9 1, 2, 3, 4, 5, 6, 7, 8, 9, and 10 than that necessary to react with the metal contaminants to be removed from the feedstock.

With respect to the additive of sulfur, the sulfur will react with the metal contaminants to form metal sulfides. As an example, if nickel (Ni) is one of the contaminants to be removed, a sulfur additive may be added that is in stoichiometric excess of the amount needed to complex with all the nickel contained in the feed to form nickel sulfide (NiS). Thus, if the sulfur additive is used in an amount of two times that necessary to react with nickel contaminants, then an additive containing 2 moles of sulfur for every one mole of nickel in the feedstock would be used. In another example, a feedstock containing 100 ppm metal contaminants may be used in an amount of 1000 ppm sulfur or other additive.

Hydrogen gas may also be used in the pretreatment. The hydrogen gas may be used in quantities of 0 scf/bbl to 1000 scf/bbl of feedstock. In particular embodiments, the amount of hydrogen gas used may be an amount from at least, equal to, and/or between any two of 0 scf/bbl, 10 scf/bbl, 20 scf/bbl, 30 scf/bbl, 40 scf/bbl, 50 scf/bbl, 60 scf/bbl, 70 scf/bbl, 80 scf/bbl, 90 scf/bbl, 100 scf/bbl, 150 scf/bbl, 200 scf/bbl, 250 scf/bbl, 300 scf/bbl, 350 scf/bbl, 400 scf/bbl, 450 scf/bbl, 500 scf/bbl, 550 scf/bbl, 600 scf/bbl, 650 scf/bbl, 700 scf/bbl, 750 scf/bbl, 800 scf/bbl, 850 scf/bbl, 900 scf/bbl, 950 scf/bbl, and 1000 scf/bbl. The added hydrogen is used to react with sulfur-containing compounds in the feed or reaction mixture so that it forms hydrogen sulfide or other reactive sulfur-containing compounds capable of reacting with metals in the feedstock. The amount of hydrogen added may therefore depend upon the sulfur content of the feed or reaction mixture.

The feedstock, additive, and optional hydrogen can be combined inside the metal-removal reaction vessel or combined before entering the vessel. The vessel may be heated to or operated at a temperature in the range of 250° F. to 850° F. In certain embodiments, the vessel may be heated to or operated at temperatures of from at least, equal to, and/or between any two of 250° F., 260° F., 270° F., 280° F., 290° F., 300° F., 310° F., 320° F., 330° F., 340° F., 350° F., 360° F., 370° F., 380° F., 390° F., 400° F., 410° F., 420° F., 430° F., 440° F., 450° F., 460° F., 470° F., 480° F., 490° F., 500° F., 510° F., 520° F., 530° F., 540° F., 550° F., 560° F., 570° F., 580° F., 590° F., 600° F., 610° F., 620° F., 630° F., 640° F., 650° F., 660° F., 670° F., 680° F., 690° F., 700° F., 710° F., 720° F., 730° F., 740° F., 750° F., 760° F., 770° F., 780° F., 790° F., 800° F., 810° F., 820° F., 830° F., 840° F., and 850° F.

The metal-removal reaction vessel may be operated at pressure of from 0 psig to 3000 psig. In certain instances, the metal removal reaction vessel may be operated at fairly low pressures of from 0 psig to 150 psig. This reduced pressure may facilitate minimizing the amount of downtime of the reactor when it must be shut down for maintenance, etc. In particular embodiments, the vessel may be operated at pressures of from at least, equal to, and/or between any two of 0 psig, 10 psig, 20 psig, 30 psig, 40 psig, 50 psig, 60 psig, 80 psig, 90 psig, 100 psig, 110 psig, 120 psig, 130 psig, 140 psig, 150 psig, 160 psig, 170 psig, 180 psig, 190 psig, 200 psig, 250 psig, 300 psig, 350 psig, 400 psig, 450 psig, 500 psig, 550 psig, 600 psig, 650 psig, 700 psig, 750 psig, 800 psig, 850 psig, 900 psig, 950 psig, 1000 psig, 1050 psig, 1100 psig, 1150 psig, 1200 psig, 1200 psig, 1250 psig, 1300 psig, 1350 psig, 1400 psig, 1450 psig, 1500 psig, 1550 psig, 1600 psig, 1650 psig, 1700 psig, 1750 psig, 1800 psig, 1850 psig, 1900 psig, 1950 psig, 2000 psig, 2050 psig, 2100 psig, 2150 psig, 2200 psig, 2200 psig, 2250 psig, 2300 psig, 2350 psig, 2400 psig, 2450 psig, 2500 psig, 2550 psig, 2600 psig, 2650 psig, 2700 psig, 2750 psig, 2800 psig, 2850 psig, 2900 psig, 2950 psig, and 3000 psig.

Optionally, a catalyst or inert solid contained within the metal-removal reaction vessel may be used in the pretreatment. The catalyst may be a non-demetallization catalyst, such as a hydrotreating catalyst or similar catalyst. A low-activity demetallization catalyst can also be used in the pretreatment reactor in certain instances. Inert solids, which may be particulate solids, on which precipitated metals may be deposited may also be used. In other applications, some low amount of demetallization catalyst may be used in the pretreatment method, but typically no demetallization catalyst is used as may be used with conventional removal of metal contaminants. Such demetallization catalyst may also include those such as used in the contamination removal baskets, as have been described.

At the reaction conditions, the contaminant removal additive reacts with the metal impurities. The reaction may be that which forms metal sulfides and reduced metals. The feedstock is altered in such a way that the pretreated feedstock becomes much more suitable for refining into the desired product. Some additive/impurity reactions may result in the precipitation of undesirable components, such as metal sulfides and reduced metals, from the liquid solution. Other additive/impurity reactions may result in the formation of desired compounds (i.e., useful metal-free organics), neutral compounds (i.e., non-useful metal-free organics, or other compounds (e.g., reduced-metal-content organics) that, while still undesirable, reduce the equipment and resources needed to produce the desired end-product from the refinable feedstock, while also lowering the risk of corrosion, catalyst deactivation, and equipment failure in the subsequent refining process to be utilized. This may also extend the life of the pretreatment beds used in contaminant removal reactors previously described, such as the reactors 10, 50, and 110.

For reactions that result in the precipitation of metal and metal-containing solids from the solution, a method of removing the solids must be employed. A variety of methods can be employed either within the reaction vessel or after the reacted feedstock exits the reaction vessel. Some examples of methods for removing precipitated solids include, but are not limited to, saddles, ceramic saddles, guard catalysts, filters, centrifuges, water wash, etc.

Desirable or undesirable gas phase products may be removed through venting. After exiting the metal-removal reaction vessel, the treated feedstocks can then be processed to produce the desired fuels or specialty chemical products using conventional refining processes with fewer, and ideally no, required equipment upgrades, additional refining steps, or significant resource requirements.

Figure 5:
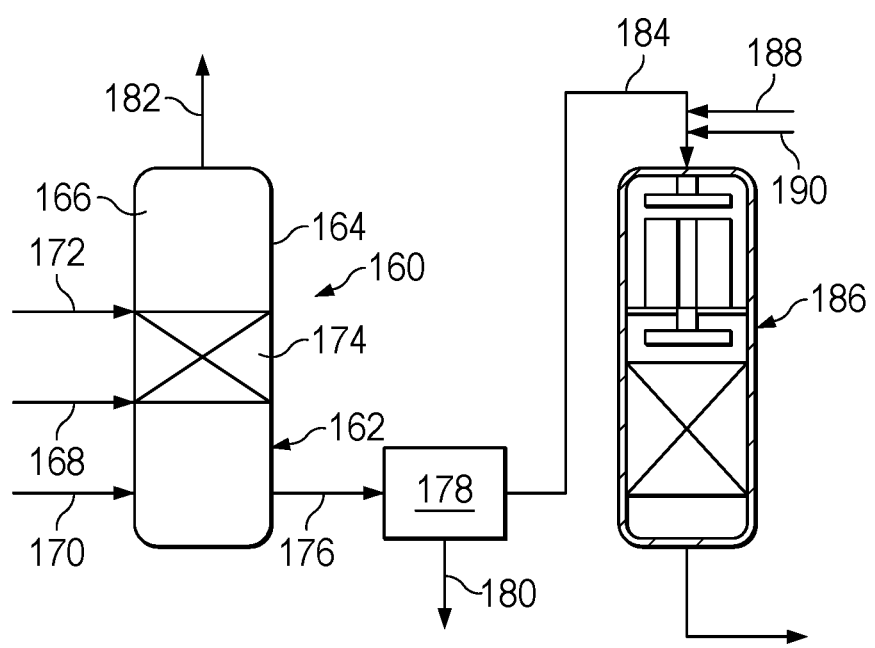
FIG. 5 is a schematic representation of a system utilizing a metal-removal pretreatment reactor in combination with a reactor for accommodating high contaminant feedstocks configured in accordance with particular embodiments of the invention.

Referring to FIG. 5 a schematic flow diagram of an exemplary pretreatment system 160 employed with a reactor for accommodating high contaminant feedstocks for removing contaminants is shown. The system 160 includes a metal-removal reactor 162 formed by a reactor vessel 164 having a reaction chamber 166 that defines a reaction zone. A refinable hydrocarbon feedstock 168 containing metal and other contaminants to be treated, metal-removal additive 170, and hydrogen gas 172 are introduced into the reaction chamber 166 of the reactor 162. The different feeds 168, 170, 172 may be added separately into the reactor 162 or may be combined upstream of the reactor 162 and introduced together into the reactor 162.

The feedstock 168 may be a petroleum and/or non-petroleum feedstock having high levels of metal and other contaminants. Petroleum feedstocks may include petroleum resids, heavy vacuum gas oil (VGO), bunker fuel, etc. The non-petroleum feedstock may include materials derived from or based on plant, vegetable, animal, and cellulosic materials, coal, and combinations of such materials. These may include but are not limited to tallow, beef tallow, bleachable fancy tallow, distillers corn oil, used cooking oil, pyrolysis oil, triglyceride-containing feedstocks, etc.

The additive feed 170 is that which is capable of reacting or complexing with metal contaminants contained in the feedstock to form a metal precipitate. This may include sulfur or a sulfur generating compound (e.g., hydrogen sulfide, bisulfide, dodecanethiol, sulfur-containing vent gases (e.g., $H_2S$, etc.), etc.). The amount of additive used may be an amount from at least, equal to, and/or between any two of greater than 0.1, 0.2, 0.3, 0.4, 0.5, 0.6, 0.7, 0.8, 0.9 1, 2, 3, 4, 5, 6, 7, 8, 9, and 10 than that necessary to react with the metal contaminants to be removed from the feedstock.

A hydrogen feed 172 is hydrogen gas in quantities of 0 scf/bbl to 1000 scf/bbl of feedstock may be fed to the reactor 162.

A catalyst bed 174 containing a non-demetallization catalyst, such as a hydrotreating catalyst or similar catalyst, a low-activity demetallization catalyst, and/or inert solid material, for facilitating the pretreatment may be provided in the reaction chamber 166 of the vessel 164. In other embodiments, no catalyst is used in the pretreatment reactor 162.

The reactor 162 is operated at reaction conditions suitable for the metal-reducing pretreatment of the feedstock. This may include a reaction temperature of from 250° F. to 850° F. and an operating pressure of from 0 psig to 3000 psig, more particularly from 600 psig to 1200 psig. In certain embodiments, low pressures of from 0 psig to 150 psig may be used. At these conditions the metal-removal additive reacts with the metal impurities in the feedstock, which precipitate and are then removed, so that the pretreated feedstock is more suitable for processing and refining downstream.

Pretreatment products include precipitated reaction products (e.g., metal sulfides, reduced metals, etc.) resulting from the reaction of contaminants with the additive. These may be removed through the reaction vessel 162 through precipitated-solids stream 176. The precipitated solid stream 176 may be further processed to remove the precipitated solids in solids separator unit 178, using those methods previously mentioned (e.g., saddles, ceramic saddles, guard catalysts, filters, centrifuges, water wash, etc.) where removed solids are removed from the pretreated feedstock as solids stream 180.

Gases, both desirable and undesirable, may be vented or removed from the reactor 162 through gas stream 182. Gases can include unreacted hydrogen gas, hydrogen sulfide, gaseous light hydrocarbons, CO, $CO_2$, etc.

A pretreated product stream 184 having reduced contaminant content is removed from the solids separator unit 178. The pretreated product stream 184 may have a reduced metal content that is reduced by an amount of from 1 wt. % to less than 100 wt. % of the contaminant content of the feedstock prior to treatment. In certain embodiments, the pretreated product stream 184 may have a reduced contaminant (or metal) content of at least, equal to, and/or between any two of 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, and 40 wt. %, 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. %, 55 wt. %, 56 wt. %, 57 wt. %, 58 wt. %, 59 wt. %, 60 wt. %, 61 wt. %, 62 wt. %, 63 wt. %, 64 wt. %, 65 wt. %, 66 wt. %, 67 wt. %, 68 wt. %, 69 wt. %, 70 wt. %, 71 wt. %, 72 wt. %, 73 wt. %, 74 wt. %, 75 wt. %, 76 wt. %, 77 wt. %, 78 wt. %, 79 wt. %, 80 wt. %, 81 wt. %, 82 wt. %, 83 wt. %, 84 wt. %, 85 wt. %, 86 wt. %, 87 wt. %, 88 wt. %, 89 wt. %, 90 wt. %, 91 wt. %, 92 wt. %, 93 wt. %, 94 wt. %, 95 wt. %, 96 wt. %, 97 wt. %, 98 wt. %, 99 wt. %, and less than 100 wt. % of the contaminant content of the feedstock prior to treatment.

The pretreated product stream 184 is then delivered to a further reactor or system 186, such as those reactors 10, 50, 110, previously described, where it may be combined with hydrogen gas 188, and optionally a diluent 190 for further contaminant removal and processing into fuels or other specialty chemicals or desired products. In the embodiment shown in FIG. 5, the reactor system 186 is that configured similarly to reactor 50, as has been disclosed.

While the invention has been shown in some of its forms, it should be apparent to those skilled in the art that it is not so limited, but is susceptible to various changes and modifications without departing from the scope of the invention based on experimental data or other optimizations considering the overall economics of the process. Accordingly, it is appropriate that the appended claims be construed broadly and, in a manner, consistent with the scope of the invention.

We claim:

1. A reactor for accommodating high contaminant liquid feedstocks comprising:
   a reactor vessel having an inlet for introducing a liquid feedstock containing contaminants into an interior of the reactor vessel, the interior being defined by an interior wall of the reactor vessel;
   a liquid distributor assembly located below and in fluid communication with the inlet for discharging the liquid feedstock radially outward towards the interior walls of the reactor vessel;
   a basket located within the reactor vessel interior and below the liquid distributor assembly, the basket having a fluid permeable outer wall and a first fluid permeable inner wall that is spaced radially inward from the outer wall to define a first annular interior space of the basket, the first annular interior space of the basket containing a particulate material for removing contaminants from the liquid feedstock, the outer wall of the basket being spaced radially inward from the interior wall of the reactor vessel to define an annular flow space between the outer wall of the basket and the interior wall of the reactor vessel, and wherein liquid feedstocks introduced into the reactor vessel from the liquid distributor assembly flow through the annular flow space and radially inward through the first annular interior space of the basket and through the particulate material to facilitate removal of contaminants from the liquid feedstock to form a purified feedstock, the first fluid permeable inner wall forming a purified feedstock outlet of the basket and defining a central conduit that extends along the length of the basket, the central conduit having a conduit outlet for discharging the purified feedstock; and
   a catalyst that is located within the reactor vessel and in fluid communication with the purified feedstock outlet of the basket for contacting the purified feedstock to form a desired product.

2. The reactor of claim 1, wherein:
   the length of the basket Lb is:

$$L_b = (D_r^2/4D_b)(\psi)$$

where $D_r$ is the interior diameter of the reactor vessel, $D_b$ is the diameter of the fluid permeable outer wall of the basket, and $\psi$ is a coefficient ranging from 1 to 20 corresponding to a cycle life of a pretreatment bed formed by the particulate material contained within the basket, with $L_b$ being less than or equal to the length of the reactor vessel.

3. The reactor of claim 1, wherein:
   the interior diameter of the reactor vessel is $D_r$ and the liquid distributor assembly is configured to provide a stagnation head $h_s$ of introduced liquids where $h_s \leq D_r/2$.

4. The reactor of claim 1, wherein:
   the outlet of the basket is configured to provide a pressure drop $\Delta P$ across the fluid permeable inner wall of from 2 to 10 times the velocity head $h_v$ at the conduit outlet.

5. The reactor of claim 1, wherein:
   the basket is a segregated basket wherein a second fluid permeable inner wall is spaced radially inward from the first fluid permeable inner wall to define a second annular interior space, the second fluid permeable inner wall defining the central conduit, and wherein the second annular interior space contains a second particulate material.

6. The reactor of claim 5, wherein:
   the second particulate material is a different particulate material for removing contaminants.

7. The reactor of claim 5, wherein:
   the second particulate material is a catalyst.

8. The reactor of claim 1, wherein:
   the catalyst is a hydroprocessing catalyst.

9. The reactor of claim 1, wherein:
   the basket is covered at an upper end to prevent the passage of fluids through the upper end of the basket.

10. A method of producing a product from high contaminant liquid feedstocks, the method comprising:
    introducing fluids comprising a liquid feedstock containing contaminants into a reactor, the reactor comprising:
    a reactor vessel having an inlet for introducing the liquid feedstock into an interior of the reactor vessel, the interior being defined by an interior wall of the reactor vessel;
    a liquid distributor assembly located below and in fluid communication with the inlet for discharging the liquid feedstock radially outward towards the interior walls of the reactor vessel;
    a basket located within the reactor vessel interior and below the distributor assembly, the basket having a fluid permeable outer wall and a first fluid permeable inner wall that is spaced radially inward from the outer wall to define a first annular interior space of the basket, the first annular interior space of the basket containing a particulate material for removing contaminants from the liquid feedstock, the outer wall of the basket being spaced radially inward from the interior wall of the reactor vessel to define an annular flow space between the outer wall of the basket and the interior wall of the reactor vessel, the first fluid permeable inner wall forming a purified feedstock outlet of the basket and defining a central conduit that extends along the length of the basket, the central conduit having a conduit outlet for discharging the purified feedstock; and
    a catalyst that is located within the reactor vessel and in fluid communication with the purified feedstock outlet of the basket for contacting the purified feedstock to form a desired product; and
    introducing the liquid feedstock into the inlet of the reactor vessel and allowing the feedstock to flow into and through the liquid distributor assembly, the liquid feedstock being discharged radially outward towards the interior walls of the reactor vessel and through the annular flow space wherein the liquid feedstock flows radially inward through the first annular interior space of the basket and through the particulate material so that contaminants are removed from the liquid feedstock to form a purified feedstock; and
    contacting the purified feedstock with the catalyst to form a desired product.

11. The method of claim 10, wherein:
    the length of the basket Lb, wherein:

$$L_b = (D_r^2/4D_b)(\psi)$$

where $D_r$ is the interior diameter of the reactor vessel, $D_b$ is the diameter of the fluid permeable outer wall of the basket, and $\psi$ is a coefficient ranging from 1 to 20 corresponding to a cycle life of a pretreatment bed formed by the particulate material contained within the basket, with $L_b$ being less than or equal to the length of the reactor vessel.

12. The method of claim 10, wherein:
    the annular flow space has a circumferential gap co that provides sufficient flow space so that the average liquid flow velocity through the annular flow space is the same as the average liquid flow velocity of the liquids discharged from the distributor assembly.

13. The method of claim 10, wherein:
the fluids further comprise at least one of a diluent and hydrogen.

14. The method of claim 10, wherein:
the interior diameter of the reactor vessel is $D_r$ and the liquid distributor assembly is configured to provide a stagnation head $h_s$ of introduced liquids where $h_s \leq D_r/2$.

15. The method of claim 10, wherein:
the outlet of the basket is configured to provide a pressure drop $\Delta P$ across the fluid permeable inner wall of from 2 to 10 times the velocity head $h_v$ at the conduit outlet.

16. The method of claim 10, wherein:
the basket is a segregated basket wherein a second fluid permeable inner wall is spaced radially inward from the first fluid permeable inner wall to define a second annular interior space, the second fluid permeable inner wall defining the central conduit, and wherein the second annular interior space contains a second particulate material.

17. The method of claim 15, wherein:
the second particulate material is a different particulate material for removing contaminants.

18. The method of claim 15, wherein:
the second particulate material is a catalyst.

19. The method of claim 10, wherein:
the catalyst is a hydroprocessing catalyst.

20. The method of claim 10, wherein:
at least one of the liquid feedstock and purified feedstock contains metal contaminants, and further comprising:
combining the at least one of the liquid feedstock and purified feedstock containing metal contaminants with a metal-removal additive, and optionally hydrogen;
allowing the metal-removal additive to react with the metals of the at least one of the liquid feedstock and purified feedstock to form a metal-containing precipitate; and
removing the metal-containing precipitate from the at least one of the liquid feedstock and purified feedstock; and then
at least one of a) introducing the liquid feedstock into the inlet of the reactor vessel, and b) contacting the purified feedstock with the catalyst to form the desired product.

* * * * *

UNITED STATES PATENT AND TRADEMARK OFFICE
CERTIFICATE OF CORRECTION

PATENT NO. : 11,607,664 B2
APPLICATION NO. : 17/234910
DATED : March 21, 2023
INVENTOR(S) : Michael D. Ackerson and Michael Steven Byars Page 1 of 1

It is certified that error appears in the above-identified patent and that said Letters Patent is hereby corrected as shown below:

In the Claims

At Column 16, Line 56, Claim 11, please replace "Lb, wherein" with --Lb is--.

At Column 16, Line 66, Claim 12, please replace "co" with --$\varepsilon_0$--.

Signed and Sealed this
Twenty-fifth Day of April, 2023

Katherine Kelly Vidal
*Director of the United States Patent and Trademark Office*